May 13, 1958 L. F. COLE 2,834,565
AUTOMATIC FLIGHT CONTROL FOR AIRCRAFT
Filed March 5, 1956
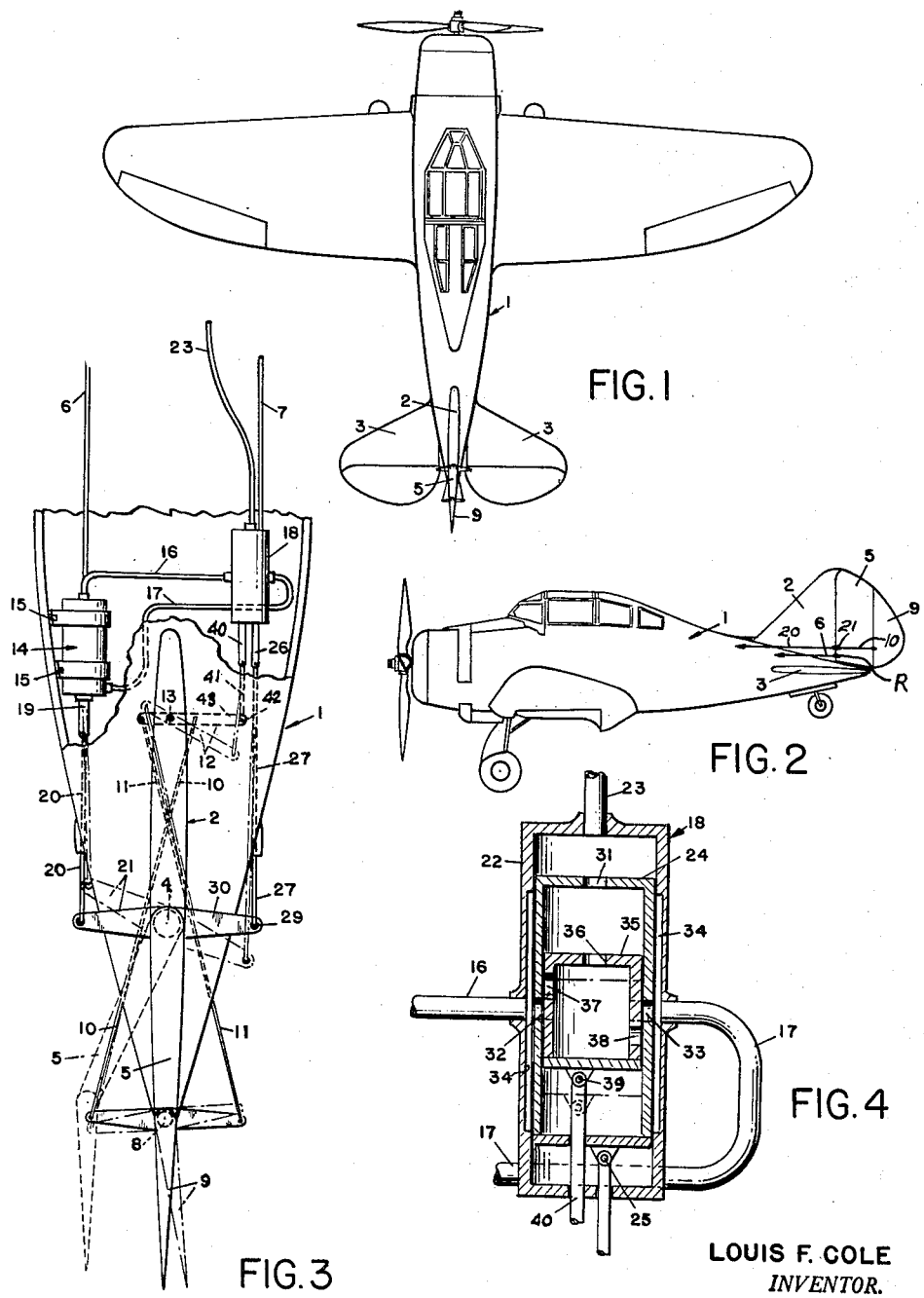
LOUIS F. COLE
INVENTOR.

United States Patent Office 2,834,565
Patented May 13, 1958

2,834,565

AUTOMATIC FLIGHT CONTROL FOR AIRCRAFT

Louis F. Cole, Sherwood, Oreg.

Application March 5, 1956, Serial No. 569,445

1 Claim. (Cl. 244—82)

This invention relates to improvements in flight controls for aircraft of the normally stable type which when displaced from its initial state of trim while in flight, tends to return to such state rather than to diverge therefrom violently or by way of short period oscillations of increasing amplitude.

It is one of the principal objects of this invention to provide, in connection with a manually operable rudder of a stable aircraft, means actuated by the impact pressure of cross-winds, air turbulence or other atmospheric disturbances commonly referred to as "gusts" for actuating the rudder to correct any resultant deviation from the desired course or compass heading of the aircraft.

Another object is to provide in connection with a manually operable rudder, means for effecting power operation of the rudder and for varying the degree of power operation in accordance with the degree of movement of the rudder from its normal neutral position.

The foregoing and other objects will appear as my invention is more fully hereinafter described in the following specification, illustrated in the accompanying drawing, and finally pointed out in the appended claim.

In the accompanying drawing:

Figure 1 is a top plan view of an airplane equipped with an automatic rudder control means in accordance with my invention.

Figure 2 is a side view of Figure 1.

Figure 3 is a fragmentary top plan view on an enlarged scale of the after end of the fuselage showing the invention in operative and inoperative positions.

Figure 4 is an enlarged sectional detail view of a valve mechanism.

Referring now more particularly to the drawing:

The aircraft shown in Figures 1 and 2 includes the conventional fuselage, indicated by reference numeral 1, and vertical and horizontal stabilizers indicated, respectively, at 2 and 3. The after end of the vertical stabilizer is provided with a rudder post 4 to which is swingably attached the forward end of a rudder 5 made in conformity with my invention and whose operation in either direction may be effected normally by means of cables 6 and 7 which are connected to standard rudder horns R (see Figure 2) directly from the pilot's rudder bar or pedals, not shown. The trailing edge of the rudder is provided with a post 8 to which is swingably attached a free floating tab 9 connected by crossed cables 10 and 11 to a rocker arm 12 pivotally mounted as at 13 within the fuselage 1.

A double acting motor 14 is rigidly mounted as at 15 within the fuselage and connected at both of its ends by conduits 16 and 17 to a control valve mechanism 18 shown more in detail in Figure 4. The connecting rod 19 of the piston within the motor 14 is connected to one end of a link 20 whose opposite end is connected to one auxiliary horn 21 of the rudder 5 disposed above the standard rudder horns R.

The control valve mechanism 18 comprises a main cylinder 22 securely mounted within the fuselage 1 and supplied with suction through a conduit 23 from any suitable source such as, for instance, the engine intake manifold, not shown. Slidably mounted within the main cylinder 22 is a valve cylinder 24 connected as at 25 and 26 to one end of a link 27 whose opposite end is connected as at 29 to the other auxiliary rudder horn 30. This cylinder 24 is ported at its top end as at 31 and at diametrically opposed points in the sidewalls as at 32 and 33. The side ports are at all times in open communication with the conduits 16 and 17 since the cylinder 24 operates within a space partially surrounded by vertical recesses 34 formed in the inner side walls of the main cylinder 22. Slidably mounted within the cylinder 24 is a companion valve cylinder 35 also ported at its top end as at 36 and provided with offset ports 37—38 through its sidewalls. This cylinder 35 is connected as at 39—40 to one end of a link 41 whose opposite end is connected as at 42 to the extended end 43 of the rocker arm 12.

From the foregoing it will be apparent that the free floating tab 9, being much more sensitive than the rudder, will be moved to the right or left from its neutral position shown in full lines in Figure 3, by any oblique impact forces greater than that of the slipstream and of sufficient magnitude to swing the aircraft from its desired heading. Movement of the free floating tab to the right, for example, as shown in broken lines in Figure 3, by a gust from the left oblique sufficient to swing the nose of the aircraft to the right will move the rocker arm 12 into the position shown in broken lines with a resultant instant rearward pull on the valve cylinder 35 to align one of its ports 37 with the port 32 in the valve cylinder 24. Alignment of these ports will direct suction from the interior of all three cylinders through conduit 16 to the forward interior of the motor 14. The resultant forward pull on the motor piston will, of course, through the medium of the link 20 and auxiliary horn 21, pull the rudder 5 into its dotted line position to instantly correct the deviation in the heading of the aircraft. The rudder upon reaching the correcting position will have, by means of the other auxiliary rudder horn 30 and link 27, pulled the valve cylinder 24 rearwardly which will misalign and therefore seal off the ports 32 and 37 while at the same time ports 33 and 38 will be brought into alignment to direct suction through conduit 17 to the rearward interior of the motor 14. The resultant rearward pull on the motor piston through link 20 will restore the rudder 5 to its neutral position as shown in full lines. Movement of the free floating tab 9 to the left about its post 8 will, of course, reverse the sequence of operations just described.

The invention operates independently of the manual rudder control and is so constituted that it does not interfere with normal operation of the conventional rudder by the rudder cables 6 and 7.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

In a control mechanism for controlling the direction of flight of an aircraft having a fuselage and a rudder movably mounted thereon and manually operable by main rudder horns and rudder cables and having a neutral position and movable in opposite directions from neutral position to steer the aircraft, the combination of an auxiliary rudder horn carried by the rudder on each side thereof, means for effecting power operation of the rudder independent of said manually operable means, said power means comprising a double acting suction motor mounted within the fuselage provided with a piston connected to one of said auxiliary rudder horns, valve means for controlling the supply of suction to said motor, said valve means including a first valve for supplying suction to the motor to operate the latter and the rudder in one direction and a second valve for supplying suction to the motor to operate the latter to return the rudder to a neutral position, a pressure responsive free-floating tab swingably attached to the rudder extending rearwardly therefrom and swingable independently of the rudder in response to impact pressures other than that of the slip stream and connected to said first valve for operating the same to control the supply of suction to said suction motor, and means interconnecting the other of said auxiliary rudder horns and said second valve for operating the latter to supply suction to the motor to return the rudder to a neutral position.

References Cited in the file of this patent

UNITED STATES PATENTS

| | | |
|---|---|---|
| 2,404,281 | Eaton | July 16, 1946 |
| 2,743,889 | White | May 1, 1956 |